UNITED STATES PATENT OFFICE.

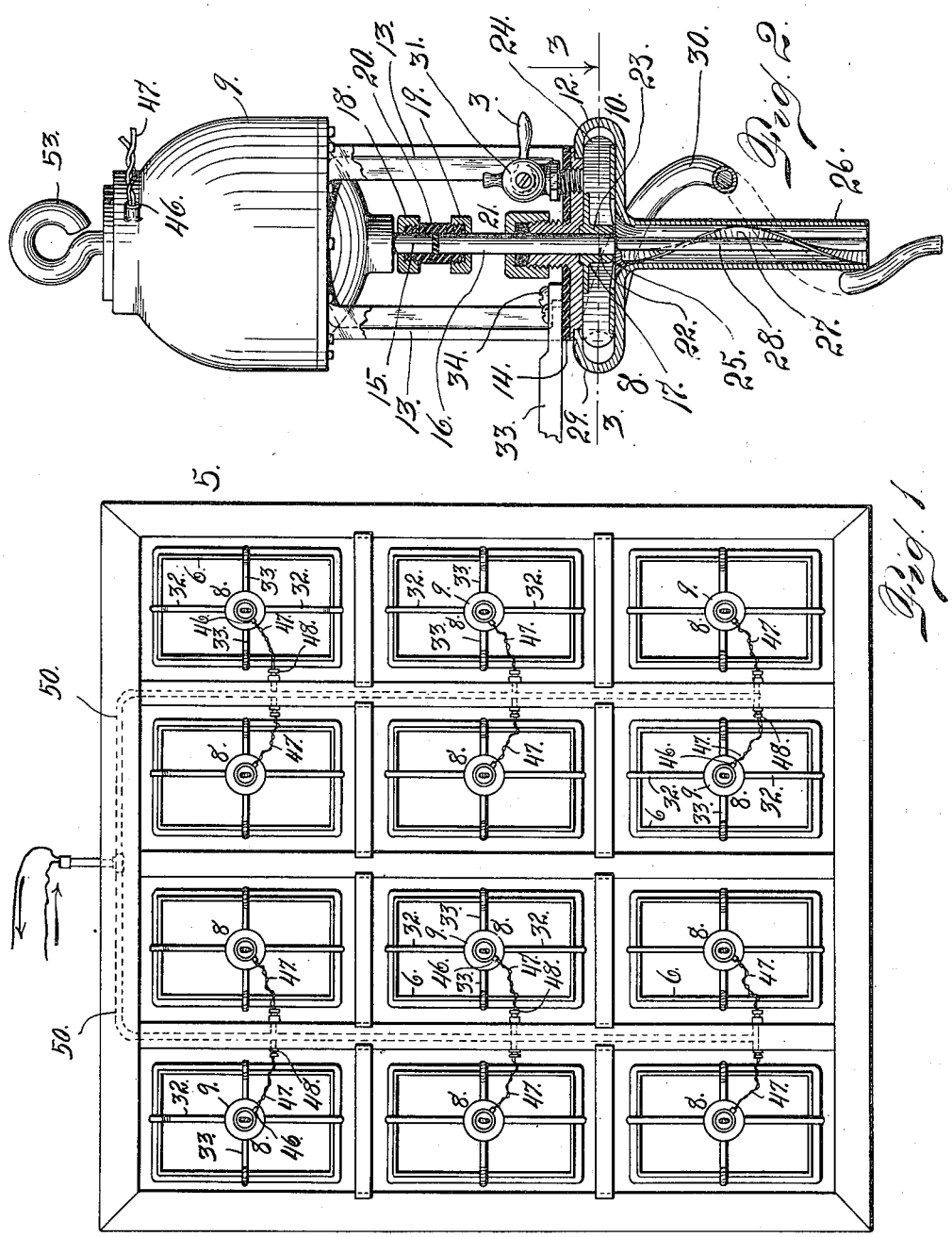

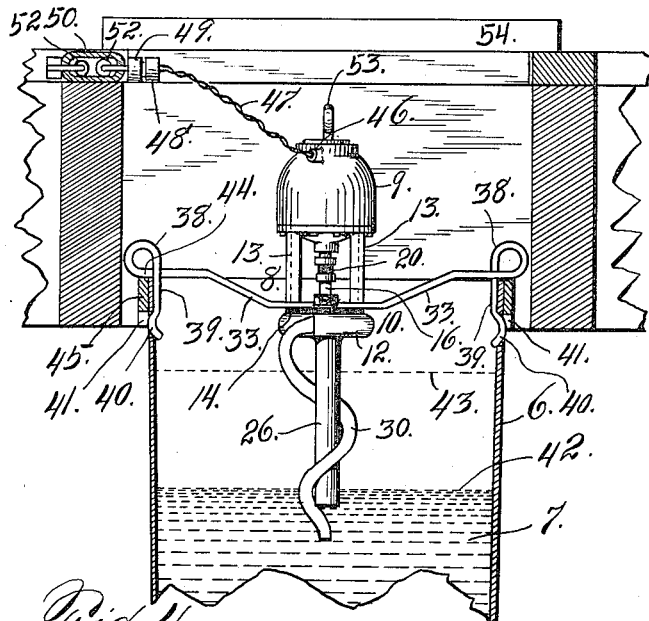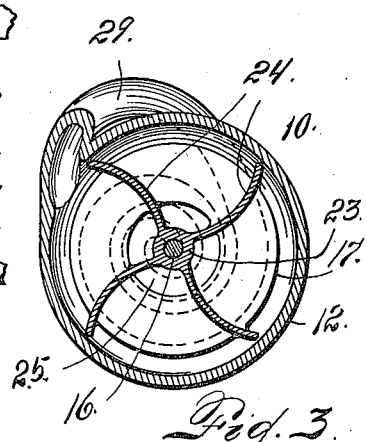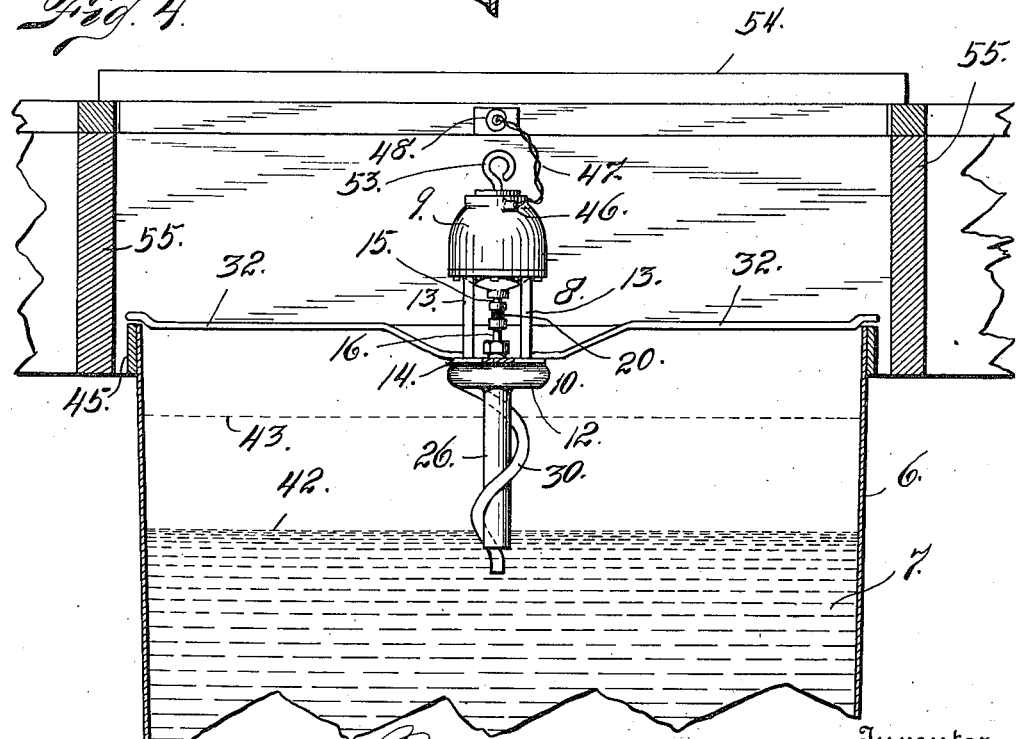

EDWARD H. ALTHOFF, OF SALT LAKE CITY, UTAH, ASSIGNOR OF ONE-HALF TO LOUIS A. ROSER, OF SALT LAKE CITY, UTAH.

WATER-AGITATOR.

1,179,064.   Specification of Letters Patent.   Patented Apr. 11, 1916.

Application filed February 19, 1915. Serial No. 9,441.

*To all whom it may concern:*

Be it known that I, EDWARD H. ALTHOFF, a citizen of the United States, residing at Salt Lake City, county of Salt Lake, and State of Utah, have invented certain new and useful Improvements in Water-Agitators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for agitating water during the freezing operation, to facilitate the freezing of ice in a perfectly clear state, thus preventing white ice, which results from air bubbles in the water. Again, by reason of this agitation of the water, all impurities of a solid character are eliminated during the freezing operation and gradually brought to the top of the can, where they may be separated from the ice cake.

My present improvement consists of special apparatus applied to each individual can of a battery or a set of cans, whereby this agitation is maintained. Broadly considered, my improvement consists in mounting a motor and a centrifugal pump upon each can, the rotor of the pump being directly connected with the armature shaft of the motor, while the shell of the centrifugal pump in which the rotor is located has an inlet and an outlet, both of which communicate with the water to be frozen in the can, these inlet and outlet conduits or passages having their lower extremities below the water to be frozen at the beginning of the freezing operation, the discharge conduit or passage extending somewhat below the corresponding extremity of the inlet passage. Both of these passages are preferably of spiral shape, the inlet passage consisting of a spiral channel which is closed on the outside by a cylindrical shell or casing, while the discharge conduit is spirally arranged around the casing of the inlet conduit or passage. This spiral inlet channel consists of a blade spirally arranged around and secured to a downward extension of the rotor shaft and fits closely, while moving freely within the outer casing, which is continuous with the shell of the pump. Hence, this spiral blade travels with the rotor and facilitates the upward travel of the water due to the suction or partial vacuum produced by the rapid movement of the rotor within the shell. The motors of a series or battery of these cans may be connected in multiple arc with a circuit whose current is supplied by a generator, or which may be obtained by tapping a circuit carrying a suitable current for the purpose.

Having briefly outlined my improved construction, I will proceed to describe the same in detail, reference being made to the accompanying drawing, in which is illustrated an embodiment thereof.

In this drawing,—Figure 1 is a top plan view of a series or battery of cans located within a framework of any desired construction or character. Fig. 2 is an elevation partly in section, illustrating a suitable construction and arrangement of motor and centrifugal pump, the parts being shown on a much larger scale than in Fig. 1. Fig. 3 is a horizontal section taken through the centrifugal pump on the line 3—3, Fig. 2. Fig. 4 is a vertical section taken through the upper portion of one of the cans within which the ice is to be frozen, the upper portion of the framework which supports the can being also illustrated. This view is taken on a larger scale than Fig. 1 and on a smaller scale than Figs. 2 and 3. Fig. 5 is a view similar to Fig. 4, the section, however, being taken at right angles to the last named figure.

The same reference characters indicate the same parts in all the views.

Let the numeral 5 designate a suitable brine-tank adapted to receive and support a series of cans 6 containing water 7 for freezing purposes. These cans are suitably supported in the brine tank, preferably in such a manner as to permit the brine to circulate freely below the bottom as well as around the vertical or upright walls of the cans. Detachably applied or connected with the top of each can, is an individual water agitating device, which may be designated in its entirety by the numeral 8. This device comprises a motor 9 and a centrifugal pump 10. This motor is connected with the shell 12 of the pump by means of uprights or spacing posts or members 13, which are insulated at their lower extremities as shown at 14, from the shell of the pump. The armature shaft 15 of the motor is securely coupled to the shaft 16 of the pump rotor 17, by means of coupling members 18 and 19 which are applied to a body of insulating material 20, which is arranged around the extremities of both shafts and also located between the adjacent ends thereof, whereby the shafts are thoroughly insulated from each other, since it is important to prevent the electric current from passing into the apparatus connected with the can.

The lower portion of the rotor shaft 16 above the shell 12 of the pump passes through a stuffing box 21 mounted on the top of the said shell, whereby the passage of water from the shell of the pump upwardly around the rotor shaft is prevented. The portion 22 of the shaft 16 immediately below the stuffing box, is secured to the hub 23 of the rotor, the said hub being equipped with a number of curved blades 24, which extend outwardly, nearly to the inner wall of the circular outer portion of the shell. Extending downwardly from the shell of the pump, which is open at the bottom for the purpose, as shown at 25, is a casing 26 within which is arranged a spiral blade 27 forming a spiral channel within the said casing. This spiral blade 27 is arranged around and secured to a depending reduced extension 28 of the rotor shaft, whereby it rotates with the rotor and within the casing 26, thus facilitating the upward movement of the water in response to the action of the rotor within the shell of the pump. By virtue of this construction and arrangement, the water enters the shell of the pump through a center bottom opening; while the circular outer portion of the shell merges into an enlargement 29 which communicates with a downwardly extending spirally arranged outlet conduit 30, whose lower extremity is open and extends somewhat below the inlet conduit, as heretofore explained.

Upon the upper part of the shell of the pump is mounted a pet cock or valve 31 having a handle 3 secured to the valve piece. The object of this valve mechanism is to reduce the suction of the pump as the process of freezing nears completion, by opening the valve to the desired extent.

The entire water agitating device designated by the numeral 8 as heretofore explained, is equipped with two pairs of arms, the individual members of one pair being each designated by the numeral 32, while the individual members of the other pair are each designated by the numeral 33. These arms are secured to the top of the casing of the pump by means of screws or other suitable fastening devices 34. The arms 32 rest upon the upper edge of the can to which the agitating apparatus is applied, while the arms 33 each terminates at its outer extremity in a spring loop or coil 38 having a downwardly extending spring member 39, whose lower extremity is outwardly curved, as shown at 40, and adapted to spring into an opening 41 formed in the can 6 near the top thereof, and above the water and ice levels.

Referring to Figs. 4 and 5 of the drawing, the water level at the beginning of the freezing operation is indicated by the numeral 42, while the dotted line 43 indicates the level of the ice after the cake is frozen within the can, the space between the lines 42 and 43 indicating the expansion due to the freezing operation.

The two arms 33 are arranged on opposite sides of the centrifugal pump. Hence, the two spring members 39 grasp the upper extremity of the tank on opposite sides and support the apparatus upon the can, since the spring loops 38 also constitute shoulders 44 which engage the upper part of the can and also the upper part 45 of the framework of the tank. By virtue of this construction and arrangement, the agitating apparatus of each can is readily removable therefrom after the freezing operation is complete. The conductors 47 which carry the current to the motor, enter the same through an opening 46 at the top of the motor casing. These conductors which are preferably in the form of a flexible cable, terminate at their extremities remote from the motor in a plug 48 adapted to enter a socket 49 which is mounted on a conduit 50 which incloses cables 52 carrying the main line conductors which are tapped for the purpose of applying current to the agitating apparatus of each can.

As this agitating apparatus is substantially identical for each can and as the manner of connecting the same with each can as well as the manner of supplying electricity to the motor thereof, is substantially identical in each case, the description of one of these agitating devices is sufficient for all.

It is evident that any desired number of cans may be arranged in a battery or series of the character indicated in Fig. 1 of the drawing.

While I have shown a spiral blade 27 which is connected with the rotor for elevating the water during the operation of the rotor or runner of the pump, it is evident that other suitable means may be employed for this purpose without departing from the spirit of the invention. It is also evident that the invention is not limited to the details of construction herein set forth, except as defined by the appended claims.

The upper extremity of the motor casing is equipped with an eye 53 whereby the person in charge of the apparatus may, by connecting a hook with the eye, lift the agitating apparatus from any can as soon as the freezing process for this particular can is complete. In response to the upward pull of the operator, the spring arms 39 are forced inwardly sufficiently to release them from the can. Furthermore, the plug 48 is also connected with the socket plug 49 so that it will slip out in response to this pull, thus making the removal of the agitating apparatus a simple and quick operation.

As illustrated in the drawing (see Figs. 4 and 5), it is intended that each agitating apparatus shall be normally concealed by a cover 54 which is applied to the box-like structure 55, which extends above each can and forms a sort of individual compartment for the motor portion of each agitating apparatus. This cover is readily removable when it becomes necessary to gain access to the agitating apparatus, as for the purpose of disconnecting the same from the can, as heretofore explained.

Having thus described my invention, what I claim is,—

1. The combination with a water-containing receptacle, of an agitating device comprising a motor and a centrifugal pump secured together in coöperative relation and both detachably supported by the said receptacle, the pump being equipped with inlet and outlet conduits communicating at one extremity with the centrifugal pump casing and at their opposite extremities with the water in the receptacle, substantially as described.

2. The combination with a water-containing receptacle, of agitating means arranged above the receptacle and detachably connected therewith, the said means comprising a motor, a centrifugal pump arranged below the motor and equipped with a vertically disposed shaft, the said shaft being in alinement with the armature of the motor and secured thereto to rotate therewith, the pump casing being provided with inlet and outlet conduits communicating therewith, substantially as described.

3. In water agitating means, the combination with a water-containing receptacle, of a centrifugal pump mounted above the receptacle and detachably connected therewith, the said pump having a suction and a discharge conduit communicating therewith and arranged in coöperative relation with the rotor of the pump, the said conduits extending below the lowest level of the water in the receptacle, a motor mounted upon the pump and having a vertically disposed armature, the rotor of the pump having an upwardly projecting shaft in alinement with the armature of the motor and secured to the latter to rotate therewith.

4. In water agitating apparatus, the combination with a water-containing receptacle suitably supported, a centrifugal pump having arms extending radially therefrom and mounted above the tank and in engagement with the latter for pump supporting purposes, two of these arms having yielding depending members engaging the upper part of the tank on the inside, the said part of the pump having openings adapted to receive parts of the said spring members, the upper portions of said members terminating in spring loops or coils which also form supporting shoulders, the casing of the pump having suction and discharge conduits communicating with the rotor chamber and both terminating below the normal surface of the water in the receptacle, the rotor of the pump having an upwardly projecting shaft, an electric motor rigidly connected with the pump and extending above the same, the axis of the motor armature being coincident with the axis of the rotor shaft of the pump, the armature and shaft being secured together to rotate in unison.

5. The combination with a water receptacle suitably supported and open at the top, agitating apparatus mounted on the receptacle and detachably connected therewith, said apparatus comprising a centrifugal pump whose rotor is equipped with upwardly projecting and depending members, the shell of the pump having a depending tube into which the depending portion of the rotor shaft extends, a blade spirally arranged around the last named portion of the rotor shaft and secured thereto to move with the rotor within the said tube, the said tube projecting below the normal water level of the receptacle, the shell of the pump having a discharge conduit also extending below the said water level, and an electric motor rigidly mounted on the shell of the pump but insulated therefrom, the armature of the motor being vertically disposed and having its axis coincident with that of the upwardly projecting part of the rotor shaft, the armature of the motor and upwardly projecting part of said shaft being secured together to rotate in unison but insulated from each other.

6. The combination with a plurality of water receptacles, an agitating apparatus detachably mounted on each receptacle and comprising a centrifugal pump and an electric motor, suction and discharge conduits in communication with the chamber of the pump at one extremity and extending below the surface of the water in the receptacle at their opposite extremities, a motor mounted above and rigidly secured to the shell of each centrifugal pump, the rotor of the pump having an upwardly projecting shaft and the motor having a vertically disposed depending armature member secured to the said shaft, whereby the two parts rotate in unison, and electric conductors connected with each motor at one extremity and terminating in a plug, a main circuit whose conductors are suitably incased and equipped with socket members, each of which is adapted to receive one of the said plugs of each of the various motors, substantially as described.

In testimony whereof I affix my signature in presence of two witnesses.

EDWARD H. ALTHOFF.

Witnesses:
   Louis A. Roser,
   J. H. Waters.